United States Patent [19]

Hewgill et al.

[11] Patent Number: 5,105,887

[45] Date of Patent: Apr. 21, 1992

[54] ENHANCED OIL RECOVERY TECHNIQUE USING HYDROGEN PRECURSORS

[75] Inventors: Gregory S. Hewgill, Chino; Leonard J. Kalfayan, Fullerton, both of Calif.

[73] Assignee: Union Oil Company of California, Los Angeles, Calif.

[21] Appl. No.: 663,267

[22] Filed: Feb. 28, 1991

[51] Int. Cl.$^5$ .................... E21B 43/24; E21B 43/22
[52] U.S. Cl. .................... 166/303; 166/272; 252/8.554
[58] Field of Search .................... 166/272, 303; 252/8.554

[56] References Cited

U.S. PATENT DOCUMENTS

| | | | |
|---|---|---|---|
| 2,857,002 | 10/1958 | Pevere et al. | |
| 3,051,235 | 8/1962 | Banks | |
| 3,084,919 | 4/1963 | Slater | |
| 3,208,514 | 9/1965 | Dew et al. | |
| 3,327,782 | 6/1967 | Hujsak | |
| 3,342,260 | 9/1967 | Lumpkin | |
| 3,527,303 | 9/1970 | Zwicky | 166/303 |
| 3,598,182 | 8/1971 | Justheim | 166/247 |
| 3,605,890 | 9/1971 | Holm | 166/272 X |
| 3,617,471 | 11/1971 | Schlinger | |
| 3,766,982 | 10/1973 | Justheim | 166/261 |
| 3,853,178 | 12/1974 | Shen | 166/272 |
| 3,973,628 | 8/1976 | Colgate | 166/283 |
| 4,050,515 | 9/1977 | Hamrick et al. | 166/303 |
| 4,127,171 | 11/1978 | Allen | 166/260 |
| 4,183,405 | 1/1980 | Magnie | 166/260 |
| 4,227,575 | 10/1980 | Nooner | 166/303 |
| 4,241,790 | 12/1980 | Magnie | 166/260 |
| 4,444,257 | 4/1984 | Stine | 166/261 |
| 4,448,251 | 5/1984 | Stine | 166/263 |
| 4,487,264 | 12/1984 | Hyne et al. | 166/272 X |
| 4,501,445 | 2/1985 | Gregoli | 166/303 X |
| 4,506,733 | 3/1985 | Hyne | 166/303 |
| 4,549,609 | 10/1985 | Watkins et al. | 166/272 X |
| 4,572,296 | 2/1986 | Watkins | 166/303 |
| 4,580,633 | 4/1986 | Watkins et al. | 166/295 |
| 4,597,441 | 7/1986 | Ware et al. | 166/261 |
| 4,660,641 | 4/1987 | Shen | 166/272 |
| 4,913,236 | 4/1990 | Reed | 166/272 X |

FOREIGN PATENT DOCUMENTS 1240262 8/1988 Canada.

OTHER PUBLICATIONS

The Future of Heavy Crude Oils and Tar Sands, First International Conference, Jun. 4–12, 1979, Chapter 51, pp. 466–468.
Elliott et al., Ind. Eng. Chem. Prod. Res. Dev., 22, pp. 426–431 (1983).
Fassihi et al., SPE 14225 (1985).
The Fourth Unitar/UNDP International Conference on Heavy Crude and Tar Sands Proceedings, vol. 4, Aug. 7–12, 1988, (Paper No. 55).
The Fourth Unitar/UNDP International Conference on Heavy Crude and Tar Sands Proceedings, vol. 4, Aug. 7–12, 1988, (Paper No. 26).
Hajdo et al., SPE 13661 (1985).
Hawley's Condensed Chem. Dictionary, 11th Edition, Van Nostrand Reinhold (1987).
Hyne, Synopsis Report No. 50, University of Tulsa-McFarlin Library, (Apr. 1986).
The Future of Heavy Crude and Tar Sands, Second International Conference, Feb. 7–17, 1982, Chapter 45.
Kirk-Othmer, Encyclopedia of Chemical Technology, Third Edition, vol. 11, pp. 251–258.
Encyclopedia Chemical Technology, Advances in Catalysis and Related Subjects, vol. 14, pp. 35–37, 110, (1963).
Merck Index, 10th Edition, (1983) p. 695.
Sachanen, Conversion of Petroleum, Second Edition, Reinhold Publishing Corp., pp. 308–310, 380 (1948).
Shu et al., SPE 12783 (1984).
Stapp, In Situ Hydrogenation, NIPER–434, Dec. 1989.
Venkatesan et al., Alteration of Heavy Oil Characteristics During Thermal Recovery, Petroleum Society of CIM., Paper No. 84-35-108, pp. 923–936 (1984).

*Primary Examiner*—George A. Suchfield
*Attorney, Agent, or Firm*—Gregory F. Wirzbicki; Shlomo R. Frieman

[57] ABSTRACT

In situ hydrogenation in a subterranean formation is readily performed by introducing a non-gaseous hydrogen precursor into steam to form a composition. The composition is injected into the oil-bearing subterranean formation to enhance the recovery of the oil from the formation.

19 Claims, No Drawings

ENHANCED OIL RECOVERY TECHNIQUE USING HYDROGEN PRECURSORS

BACKGROUND

The present invention relates to in situ hydrogenation enhanced oil recovery, a composition for use in in situ enhanced oil recovery, and an in situ enhanced oil recovery system.

In situ hydrogenation entails heating a reservoir to an appropriate temperature (e.g., by steam injection or in situ combustion) and introducing gaseous hydrogen at an elevated temperature into the reservoir. Despite the many proposals advanced over the past 30 years, in situ hydrogenation is rarely, if ever, employed in a commercial enhanced oil recovery process.

SUMMARY OF THE INVENTION

The present invention provides a facile, in situ hydrogenation technique for enhancing the recovery of oil. In particular, the in situ hydrogenation technique of the invention entails injecting a steam- and hydrogen precursor-containing stream into a wellbore penetrating at least a portion of an oil-containing subterranean formation. As used in the specification and claims, the term "hydrogen precursor" means a non-gaseous composition that decomposes to form hydrogen (i.e., $H_2$) at a temperature less than about 650° F. and a pressure of about one atmosphere. The hydrogen precursors generally form one or more other gaseous products under these conditions.

The use of a non-gaseous composition as the hydrogen source greatly simplifies the in situ hydrogenation process because it is much easier to introduce a solid or a liquid composition into steam than it is to introduce a gas, such as hydrogen, into steam. Furthermore, some of the other decomposition products, e.g., carbon dioxide and carbon monoxide, also aid in recovering oil from oil-bearing subterranean formations.

In addition to the in situ hydrogenation technique, the invention also encompasses (a) a composition comprising steam and a hydrogen precursor and (b) an enhanced oil recovery system. The enhanced oil recovery system comprises a subterranean formation and a well penetrating at least a portion of the subterranean formation. The well comprises a casing having an interior bore which is in fluid communication with at least a portion of the formation. The steam- and hydrogen precursor-containing composition is present in at least a portion of the interior bore of the well.

DETAILED DESCRIPTION OF THE INVENTION

The enhanced oil recovery method of the present invention comprises injecting a steam- and hydrogen precursor-containing stream into the wellbore penetrating at least a portion of an oil-bearing subterranean formation. As previously mentioned, the term "hydrogen precursor" as used in the specification and claims means a non-gaseous composition that decomposes to form hydrogen (i.e., $H_2$) at a temperature less than about 650° F. and a pressure of about one atmosphere. Preferably, the hydrogen precursor decomposes and forms, inter alia, hydrogen at a temperature less than about 550° F. and a pressure of about one atmosphere.

Exemplary hydrogen precursors include, but are not necessarily limited to, formic acid, organic salts of formic acid, inorganic salts of formic acid, formate esters, formamide, and N-substituted formamides. Typical organic salts of formic acid are mono-, di-, and tri-substituted ammonium formate. The ammonium formate is substituted with, for example, alkyl groups, hydroxyalkyl groups, or both alkyl and hydroxyalkyl groups. Generally, the alkyl groups contain from 1 to about 6 carbon atoms and, preferably, the alkyl group is methyl or ethyl. The hydroxyalkyl groups typically also contain 1 to about 6 carbon atoms, with hydroxyethyl being the preferred hydroxyalkyl group. Both the alkyl and hydroxyalkyl groups are either branched or strait chain groups.

Regarding inorganic salts of formic acid, such salts include ammonium formate and alkali metal salts of formic acid. Preferred alkali metal salts are sodium, potassium, and lithium, and more preferably are sodium and potassium.

Concerning formate esters, representative formate esters are alkyl formates and aryl formates. The alkyl moiety of the alkyl formates is usually a straight or branched chain alkyl group having 1 to about 6 carbon atoms. More typically, the alkyl moiety contains 1 or 2 carbon atoms. Phenyl formate is an exemplary aryl formate.

Typical N-substituted formamides are methyl formamide, dimethyl formamide, ethyl formamide, and diethyl formamide.

The steam- and hydrogen precursor-containing stream is generally formed by generating steam (e.g., by heating feed water in a steam generator) of up to about 100 percent steam quality. Preferably, the steam quality is about 20 to about 80 percent. The temperature of the generated steam is typically about 500° to about 650° F., and preferably about 500° to about 550° F. The generated steam is transported in a conduit towards an injection well.

Usually, the hydrogen precursor is injected into the conduit and begins mixing with the steam at a preselected location between the exit of the steam generator and the entrance to the injection well. The amount of hydrogen precursor injected into the steam is typically sufficient for the resulting stream to have a hydrogen precursor concentration of at least about 0.01 weight percent. Preferably, the hydrogen precursor concentration in the stream is about 0.01 to about 50, more preferably about 0.05 to about 10, and most preferably about 0.1 to about 5, weight percent. As used in the specification and claims, the weight percent of hydrogen precursor in the stream is based on the weight of the hydrogen precursor injected into the steam per minute divided by the sum of (a) the weight of the hydrogen precursor injected into the steam per minute and (b) the weight of the cold water equivalent of steam generated per minute.

The steam- and hydrogen precursor-containing composition or stream optionally contains one or more other ingredients, e.g., a base, a buffer, a hydrogenation catalyst, and a hydrogenation catalyst precursor. When employed, the optional ingredients are typically introduced into the steam-containing conduit at one or more preselected locations between the steam generator and the injection well. Preferably, the base and/or buffer are introduced into the conduit downstream from the location where the hydrogen precursor is introduced.

Exemplary bases include, but are not necessarily limited to, alkali metal hydroxides (e.g., sodium hydroxide and potassium hydroxide), ammonium hydroxide, and alkali metal carbonates (e.g., sodium carbonate and potassium carbonate). The preferred bases are sodium hydroxide and ammonium hydroxide.

Representative buffers are ammonium carbonate, acetic acid-acetate salt combination, alkali metal phthalates (e.g., sodium phthalate and potassium phthalate), borates (e.g., sodium borate), oxylates (e.g., disodium oxylate), and phosphates (e.g., sodium phosphate, dibasic).

The bases and buffers are generally employed in a concentration sufficient for the liquid phase of the steam- and hydrogen precursor-containing stream to have a pH of about 5 to about 10.5. Preferably, the concentration of base or buffer is sufficient for the stream to have a pH of about 8.5 to about 10.

The hydrogenation catalyst is typically employed in the stream when the process of the present invention is used to enhance the recovery of oil having a total sulfur content of less than about 0.1 weight percent of the oil. Typically, the hydrogenation catalyst is a metal salt whose cation is a metal selected from the group consisting of titanium, vanadium, chromium, manganese, iron, cobalt, nickel, copper, zinc, molybdenum, and aluminum. Usually, the anion moiety of the salt is a halogen (e.g., chlorine) or sulphate. Generally, the metal salt is introduced into conduit as a metal salt-containing aqueous solution. The concentration of metal salt introduced into the formation is preferably from about 0.001 to about 10, and more preferably about 0.01 to about 5, weight percent. As used in the specification and claims, the weight percent of hydrogenation catalyst in the stream is based on the weight of the hydrogenation catalyst injected into the steam per minute divided by the weight of the cold water equivalent of steam generated per minute.

A hydrogenation catalyst precursor is preferably employed for treating a subterranean formation whose oil contains more than about 0.1 weight percent total sulfur. An exemplary hydrogenation catalyst precursor is molybdic acid which reacts with the endogenous hydrogen sulfide to form molybdenum sulphide—a hydrogenation catalyst. Preferably from about 0.001 to about 10, and more preferably about 0.01 to about 5, weight percent hydrogenation catalyst precursor is used in the process of the invention. As used in the specification and claims, the weight percent of hydrogenation catalyst precursor in the stream is based on the weight of the hydrogenation catalyst precursor injected into the steam per minute divided by the weight of the cold water equivalent of steam generated per minute.

The stream containing the steam, the hydrogen precursor, and any optional ingredient is injected into the formation. Generally, the injection pressure of the stream is about 200 to about 2,000 psig and preferably is about 300 to about 1,000 psig. The period over which the stream is injected usually ranges from about an hour to about the entire duration of the steam flood. Alternatively, the stream is periodically injected into the well during the course of the steam flood. The duration of each pulse typically varies from about one hour to about several months.

Formations containing heavy oils, i.e., oils having an API gravity of less than about 20° are prime candidates for treatment by the enhanced oil recovery process of this invention.

EXAMPLES

In the following examples, the efficacy of the procedure of the present invention is demonstrated. Example 1, which exemplifies and does not limit the process of the invention, uses formic acid as the hydrogen precursor and molybdenum disulfide as the hydrogenation catalyst. Example 2 is a control.

EXAMPLE 1

A 1 liter reactor equipped with a stirrer was charged with Ventura crude oil (300 g; API gravity 16°), an aqueous formic acid solution (about 10 ml formic acid dissolved in about 290 g water), about 1 g $MoS_2$, and Sespe formation material (about 100 g).

After purging the reactor with nitrogen to remove substantially all the air present in the reactor, the reactor was heated. The temperature and pressure within the reactor during the course of the experiment were recorded and are set forth in the following Table I.

TABLE I

| Time | Pressure, psig | Temperature, °F. |
|---|---|---|
| 0 | 0 | 73 |
| 13 min | 50 | 122 |
| 28 min | 125 | 338 |
| 38 min | >225 | 405 |
| 53 min | <425 | 450 |
| 1 hr 53 min | 1,225 | 538 |
| 2 hr 13 min | 1,375 | 553 |
| 2 hr 38 min | 1,375 | 550 |
| 3 hr 13 min | 1,375 | 547 |
| 18 hr 48 min | 1,375 | 537 |
| 21 hr 3 min | 1,625 | 551 |
| 27 hr 38 min | 1,600 | 556 |
| 42 hr 48 min | 1,500–1,525 | 555 |
| 51 hr 18 min | 1,500–1,525 | 552 |
| 66 hr 48 min | 1,500 | 554 |
| 75 hr 23 min | 1,500 | 557 |
| 163 hr 13 min | 1,425 | 553 |
| 171 hr 38 min | 1,325 | 554 |
| 186 hr 58 min | 1,325 | 555 |
| 190 hr 8 min | Begin Cooling | |
| 195 hr 38 min | ~225 | 152 |

Between about the 163rd and 186th hours of the experiment, the reactor pressure actually declined over time—a phenomenon that strongly suggests the uptake of hydrogen gas. This hypothesis was subsequently confirmed by the results, a portion of which are set forth below in Table II, of an analysis of a sample of the gas phase within the reactor at the end of the experiment.

TABLE II

| Inorganic Component | Mole Percent |
|---|---|
| Hydrogen | 16.21 |
| Carbon Monoxide | 0.38 |
| Carbon Dioxide | 35.47 |

More particularly, the decomposition of formic acid during the experiment is believed to be primarily achieved by the following dehydration and dehydrogenation reactions, respectively.

$$HCOOH \rightarrow H_2O + CO$$

$$HCOOH \rightarrow H_2 + CO_2$$

In addition the carbon monoxide is believed to react with water in accordance with the following water gas shift reaction.

$$H_2O + CO \rightarrow H_2 + CO_2$$

Accordingly, for every mole of carbon dioxide formed by the decomposition of the formic acid present in the reactor, one mole of hydrogen is also formed. However, the gas sample analysis results listed above in Table II indicate that there was over twice as much carbon dioxide in the gas sample than theoretically expected. The uptake of hydrogen gas by the oil present in the reactor accounts for both the observed drop in reactor pressure and the the lower-than-expected hydrogen content of the gas sample.

The oil and significantly reduced the asphaltene content of the oil.

EXAMPLE 2

Control

The procedure of Example 1 was repeated with one major modification—no formic acid was added to the reactor. The highest pressure reached during Example 2 was about 1,025 psig. The procedure of Example 2 substantially failed to affect the API gravity and had a much smaller effect on the asphaltene content of the treated oil.

By increasing the API gravity of the oil, the process of the present invention makes the oil more amenable to being recovered from subterranean formations. In addition, by reducing the asphaltene content of the oil, the resulting oil is more suitable for subsequent oil refining procedures because less unwanted polynuclear aromatic compounds are likely to be formed.

In addition, the hydrogen gas produced by decomposing the hydrogen precursor increases formation pressure and potentially increases the rate of hydrocarbon production. Also, the method of the invention does not complicate the steam injection process because introducing a liquid or a solid into steam is much easier than introducing a gas into steam. Furthermore, the introduction of a liquid or solid hydrogen precursor into steam results in less BTU units being lost as the steam traverses the wellbore than is the case when hydrogen gas is injected into the steam.

Another advantage of the present invention is that by-products of the degradation of some of the hydrogen precursors is carbon dioxide and/or carbon monoxide—substances that aid in further reducing the viscosity of oil within the formation. This further helps to increase the production of oil from the formation.

Although the present invention has been described in considerable detail with reference to some preferred versions, other versions are possible. For example, other bases, buffers, hydrogenation catalysts, and hydrogenation catalyst precursors in addition to those discussed above, can be employed in the enhanced oil recovery process of the invention. Furthermore, additional optional additives which further enhance the recovery of oil from subterranean formations can be incorporated into the injected stream. Therefore, the spirit and scope of the appended claims should not necessarily be limited to the description of the preferred versions contained herein.

What is claimed is:

1. An enhanced oil recovery method comprising the step of injecting a stream into a wellbore penetrating at least a portion of an oil-containing subterranean formation, the stream comprising steam and an ingredient selected from the group consisting of formic acid, organic salts of formic acid, alkali metal salts of formic acid, formate esters, formamide, N-substituted formamides, and mixtures thereof.

2. The method of claim 1 wherein the ingredient is an organic salt of formic acid.

3. The method of claim 1 wherein the ingredient is selected from the group consisting of mono-, di-, and tri-substituted ammonium formate.

4. The method of claim 3 wherein the substituent is selected from the group consisting of alkyl groups containing 1 to about 6 carbon atoms, hydroxyalkyl groups containing 1 to about 6 carbon atoms, and mixtures thereof.

5. The method of claim 3 wherein the substituent is selected from the group consisting of methyl, ethyl, and hydroxyethyl.

6. The method of claim 1 wherein the ingredient is an alkali metal salt of formic acid.

7. The method of claim 1 wherein the ingredient is a formate ester.

8. The method of claim 1 wherein the ingredient is formamide.

9. The method of claim 1 wherein the ingredient is an N-substituted formamide.

10. The method of claim 1 wherein the ingredient is an N-substituted formamide selected from the group consisting of methyl formamide, dimethyl formamide, ethyl formamide, and diethyl formamide.

11. An enhanced oil recovery method comprising the step of injecting a stream into a wellbore penetrating at least a portion of an oil-containing subterranean formation, the stream comprising steam and formic acid.

12. An enhanced oil recovery method comprising the step of injecting a stream into a wellbore penetrating at least a portion of an oil-containing subterranean formation, the stream comprising steam and a formate ester selected from the group consisting of alkyl formates, aryl formates, and mixtures thereof.

13. A recovery system comprising:
    (a) a subterranean formation;
    (b) a well penetrating at least a portion of the subterranean formation, the well comprising a casing having an interior bore, the interior bore being in fluid communication with at least a portion of the formation; and
    (c) a composition present in at least a portion of the interior bore of the well, the composition comprising steam and an ingredient selected from the group consisting of formic acid, organic salts of formic acid, alkali metal salts of formic acid, formate esters, formamide, N-substituted formamides, and mixtures thereof.

14. The recovery system of claim 13 wherein the ingredient is formic acid.

15. The recovery system of claim 13 wherein the ingredient is a formate ester.

16. The recovery system of claim 13 wherein the ingredient is an organic salt of formic acid.

17. The recovery system of claim 13 wherein the ingredient is an alkali metal salt of formic acid.

18. The recovery system of claim 13 wherein the ingredient is formamide.

19. The recovery system of claim 13 wherein the ingredient is an N-substituted formamide.

* * * * *